(12) United States Patent
Jensen et al.

(10) Patent No.: US 10,241,481 B2
(45) Date of Patent: Mar. 26, 2019

(54) METHODS AND APPARATUS FOR CONTROLLING MULTIPLE VALVES AS A SINGLE VALVE BASED ON A COORDINATED CONTROL SIGNAL

(71) Applicant: Fisher Controls International LLC, Marshalltown, IA (US)

(72) Inventors: Kurtis Jensen, Marshalltown, IA (US); Roger Anders, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 64 days.

(21) Appl. No.: 15/462,365

(22) Filed: Mar. 17, 2017

(65) Prior Publication Data

US 2018/0267565 A1    Sep. 20, 2018

(51) Int. Cl.
| | |
|---|---|
| F16K 31/00 | (2006.01) |
| G05B 15/02 | (2006.01) |
| G05B 19/43 | (2006.01) |
| G05B 19/44 | (2006.01) |
| G05B 19/46 | (2006.01) |
| G05B 19/042 | (2006.01) |

(52) U.S. Cl.
CPC .............. *G05B 15/02* (2013.01); *F16K 31/00* (2013.01); *G05B 19/042* (2013.01); *G05B 19/43* (2013.01); *G05B 19/44* (2013.01); *G05B 19/46* (2013.01); *G05B 2219/45006* (2013.01)

(58) Field of Classification Search
None
See application file for complete search history.

(56) References Cited

U.S. PATENT DOCUMENTS

| | | | |
|---|---|---|---|
| 4,640,095 A | | 2/1987 | Engel et al. |
| 5,709,079 A | * | 1/1998 | Smith ........................ F02C 9/28 60/39.281 |
| 5,954,089 A | * | 9/1999 | Seymour ............. F16K 31/0675 137/487.5 |
| 2018/0073679 A1 | * | 3/2018 | Roberge .................. F17C 5/007 |

FOREIGN PATENT DOCUMENTS

| | | |
|---|---|---|
| AU | 2007281816 | 2/2008 |
| CN | 103851246 | 6/2014 |
| EP | 2141423 | 1/2010 |
| JP | H10228322 | 8/1998 |
| WO | WO-2016146913 A1 * | 9/2016 .............. F17C 5/007 |

OTHER PUBLICATIONS

International Search Authority, "International Search Report and Written Opinion," issued in connection with International Patent Application No. PCT/2018/021766, dated Jun. 26, 2018, 16 pages.

* cited by examiner

*Primary Examiner* — Ryan A Jarrett

(74) *Attorney, Agent, or Firm* — Hanley, Flight & Zimmerman, LLC

(57) ABSTRACT

Methods and apparatus for controlling multiple valves as a single valve based on a coordinated control signal are disclosed. In some examples, an apparatus includes a valve controller to be operatively coupled to a first valve and a second valve. In some examples, the second valve is to be operatively positioned in series with the first valve. In some examples, the valve controller is to control a position of the first valve and a position of the second valve based on a coordinated control signal to be received by the valve controller.

20 Claims, 5 Drawing Sheets

METHODS AND APPARATUS FOR CONTROLLING MULTIPLE VALVES AS A SINGLE VALVE BASED ON A COORDINATED CONTROL SIGNAL

FIELD OF THE DISCLOSURE

This disclosure relates generally to methods and apparatus for controlling multiple valves and, more specifically, to methods and apparatus for controlling multiple valves as a single valve based on a coordinated control signal.

BACKGROUND

In conventional process control environments, multiple valves are independently controlled by corresponding ones of multiple valve controllers. For example, a first valve of the process control environment may be independently controlled by a first valve controller, and a second valve of the process control environment may be independently controlled by a second valve controller.

SUMMARY

Methods and apparatus for controlling multiple valves as a single valve based on a coordinated control signal are disclosed. In some disclosed examples, an apparatus includes a valve controller to be operatively coupled to a first valve and a second valve. In some disclosed examples, the second valve is to be operatively positioned in series with the first valve. In some disclosed examples, the valve controller is to control a position of the first valve and a position of the second valve based on a coordinated control signal to be received by the valve controller.

In some disclosed examples, a method includes controlling, via a valve controller, a position of a first valve and a position of a second valve based on a coordinated control signal received by the valve controller. In some disclosed examples, the valve controller is operatively coupled to the first valve and the second valve. In some disclosed examples, the second valve is operatively positioned in series with the first valve.

In some disclosed examples, a tangible machine readable storage medium includes instructions that, when executed, cause a valve controller to control a position of a first valve and a position of a second valve based on a coordinated control signal received by the valve controller. In some disclosed examples, the valve controller is operatively coupled to the first valve and the second valve. In some disclosed examples, the second valve is operatively positioned in series with the first valve.

Figure 1:
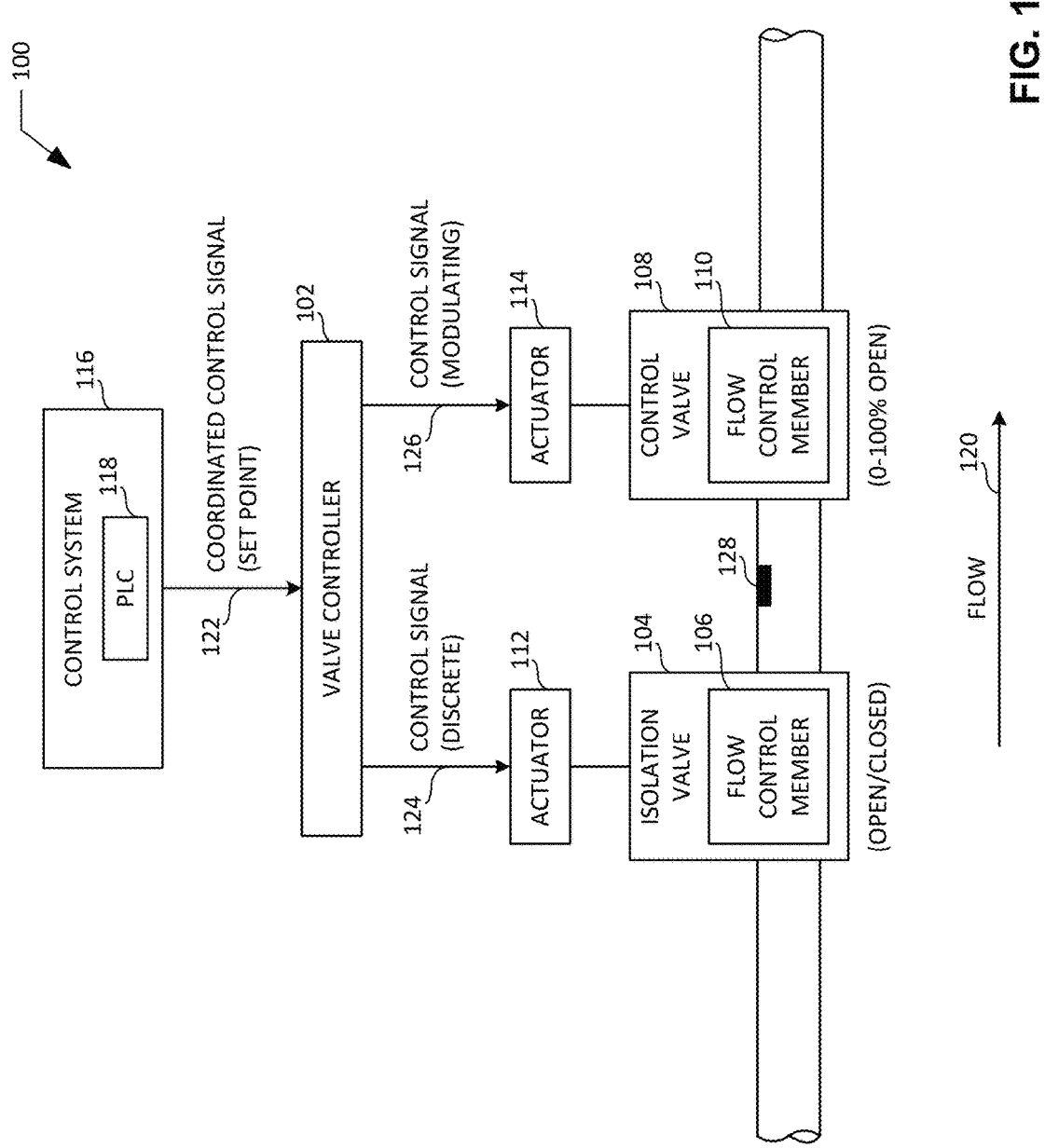
FIG. 1 is a first example process control environment including an example valve controller for controlling multiple valves as a single valve based on a coordinated control signal.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Conventional process control environments may include one or more control system(s) in communication with multiple valve controllers independently controlling corresponding ones of multiple valves. For example, an isolation valve (e.g., an on/off valve, a shut-off valve, etc.) may be operatively positioned in series with a control valve. The isolation valve may be independently controlled by a first valve controller in communication with a control system, and the control valve may be independently controlled by a second valve controller in communication with the control system. Placement of the isolation valve in series with the control valve may advantageously prolong the life of the control valve. For example, although control valves are suitable for controlling the flow rate of a process fluid, control valves are typically not intended to provide tight shutoff of the flow of the process fluid. When a control valve is implemented to shut off the flow of the process fluid, excessive wear on the valve trim and seat may occur, and the control valve may begin to leak the process fluid even when the control valve is in the fully-closed position. By implementing the isolation valve to shut off the flow of the process fluid that would otherwise require shutoff via the control valve, the valve trim and seat of the control valve are protected from excessive wear.

In conventional process control environments, however, the introduction of an additional valve (e.g., an isolation valve to be placed in series with an existing control valve) typically requires a corresponding introduction of an additional valve controller, as well as use of an additional input/output channel of the control system. The complexity of the conventional process control environment increases as a result of the introduction of such additional device(s). For example, the introduction of such additional device(s) typically requires the configuration and installation of additional wiring to operate the additional valve and/or the additional valve controller, and may further require additional automated process control design work to properly operate the additional valve and/or the additional valve controller.

Unlike the conventional process control environments described above having multiple valve controllers for independently controlling corresponding ones of multiple valves, the methods and apparatus disclosed herein enable a single valve controller to control multiple valves as a single valve based on a coordinated control signal. As used herein, the term "coordinated control signal" refers to a single signal that includes and/or carries data and/or information constituting and/or indicative of respective control signals to control corresponding ones of multiple valves. For example, a coordinated control signal may include and/or carry data and/or information constituting and/or indicative of a first control signal to control a position of a first valve, and a second control signal to control a position of a second valve.

Implementation of a single valve controller to control multiple valves as a single valve based on a coordinated control signal provides several advantages relative to the above-described conventional process control environments. For example, because the disclosed valve controller is able to control multiple valves (e.g., an isolation valve and a control valve), the introduction of one of the multiple valves (e.g., the isolation valve) to a process control environment including the disclosed valve controller does not require a corresponding introduction of an additional valve controller. Accordingly, the additional input/output channel of the control system that would otherwise be required when introducing such an additional valve controller may be reclaimed and/or repurposed. Any need for additional wiring and/or additional automated process control design work to operate the additional valve and/or the additional valve controller is also reduced relative to that which might be required when introducing an additional valve and/or an additional valve controller into a conventional process control environment as described above.

FIG. 1 is a first example process control environment 100 including an example valve controller 102 for controlling multiple valves as a single valve based on a coordinated control signal. In the illustrated example of FIG. 1, the process control environment 100 includes the valve controller 102, a first example valve 104 having a first example flow control member 106, a second example valve 108 having a second example flow control member 110, a first example actuator 112, a second example actuator 114, and an example control system 116 having an example programmable logic circuit (PLC) 118.

In the illustrated example of FIG. 1, the valve controller 102 is operatively coupled to the first actuator 112, the second actuator 114, and the control system 116. The valve controller 102 is also operatively coupled to the first valve 104 via the first actuator 112, and to the second valve 108 via the second actuator 114. Thus, the valve controller 102 of FIG. 1 may control the first valve 104 and/or the second valve 108 via communications (e.g., signals, messages, etc.) transmitted from the valve controller 102 to the corresponding first actuator 112 and/or the corresponding second actuator 114.

For example, in response to a control signal (e.g., a pneumatic control signal, a hydraulic control signal, an electrical control signal, etc.) transmitted from the valve controller 102 to the first actuator 112 (e.g., a pneumatic actuator, a hydraulic actuator, a solenoid, etc.), the first actuator 112 moves and/or adjusts a position of the first flow control member 106 (e.g., a plug, a disk, a ball, etc.) of the first valve 104 such that the position of the first flow control member 106 matches a desired position (e.g., a closed position) indicated by the control signal. As another example, in response to a control signal (e.g., a pneumatic control signal, a hydraulic control signal, an electrical control signal, etc.) transmitted from the valve controller 102 to the second actuator 114 (e.g., a pneumatic actuator, a hydraulic actuator, a solenoid, etc.), the second actuator 114 moves and/or adjusts a position of the second flow control member 110 (e.g., a plug, a disk, a ball, etc.) of the second valve 108 such that the position of the second flow control member 110 matches a desired position (e.g., a closed position) indicated by the control signal.

In the illustrated example of FIG. 1, the second valve 108 is operatively positioned in series with the first valve 104. For example, the second valve 108 may be positioned in series with the first valve 104 such that a process fluid traveling in an example flow direction 120 as shown in FIG. 1 passes through the first valve 104 and subsequently passes through the second valve 108 when the first valve 104 and the second valve 108 are both in an open position. In the illustrated example of FIG. 1, the first valve 104 is an isolation valve and the second valve 108 is a control valve. In other examples, the first valve 104 may be a type of valve other than an isolation valve (e.g., a control valve, etc.), and the second valve 108 may be a type of valve other than a control valve (e.g., an isolation valve, etc.). Although the example process control environment 100 of FIG. 1 illustrates a specific number of valves, specific valve types, and a specific arrangement of the valve types relative to one another, in other examples the process control environment may include any number of additional valves, any number of valve types, and any arrangement of the valve types relative to one another.

The valve controller 102 of FIG. 1 controls a position of the first valve 104 and a position of the second valve 108 based on an example coordinated control signal 122 received by the valve controller 102 from the PLC 118 and/or, more generally, from the control system 116. In some examples, the coordinated control signal 122 corresponds to a set point associated with a position of the first valve 104 (e.g., a desired position of the first valve 104) and/or a set point associated with a position of the second valve 108 (e.g., a desired position of the second valve 108). In the illustrated example of FIG. 1, the coordinated control signal 122 includes and/or carries data and/or information constituting and/or indicative of respective control signals to control the respective positions of corresponding ones of the first flow control member 106 of the first valve 104 and the second flow control member 110 of the second valve 108.

For example, if the coordinated control signal 122 of FIG. 1 is implemented as an analog signal, a first instance of the analog coordinated control signal 122 measuring twenty milliamps (20 mA) may indicate to the valve controller 102 that the first flow control member 106 of the first valve 104 is to be in an open position and that the second flow control member 110 of the second valve 108 is to be in a fully-open (e.g., 100% open) position. A second instance of the analog coordinated control signal 122 measuring twelve milliamps (12 mA) may indicate to the valve controller 102 that the first flow control member 106 of the first valve 104 is to be in an open position and that the second flow control member 110 of the second valve 108 is to be in a partially-open and/or partially-closed (e.g., 50% open) position. A third instance of the analog coordinated control signal 122 measuring four milliamps (4 mA) may indicate to the valve controller 102 that the first flow control member 106 of the first valve 104 is to be in a closed position and that the second flow control member 110 of the second valve 108 is to be in a fully-closed (e.g., 0% open) position.

If the coordinated control signal 122 of FIG. 1 is instead implemented as a digital signal, a first group of bits (e.g., one or more bits) of the digital signal may indicate a desired position of the first flow control member 106 of the first valve 104, and a second group of bits of the digital signal may indicate a desired position of the second flow control member 110 of the second valve 108. For example, a first instance of the digital coordinated control signal 122 coded in a first manner may include a first group of bits indicating to the valve controller 102 that the first flow control member 106 of the first valve 104 is to be in an open position, and a second group of bits indicating to the valve controller 102 that the second flow control member 110 of the second valve 108 is to be in a fully-open (e.g., 100% open) position. A second instance of the digital coordinated control signal 122 coded in a second manner may include a first group of bits indicating to the valve controller 102 that the first flow control member 106 of the first valve 104 is to be in an open position, and a second group of bits indicating to the valve controller 102 that the second flow control member 110 of the second valve 108 is to be in a partially-open and/or partially-closed (e.g., 50% open) position. A third instance of the digital coordinated control signal 122 coded in a third manner may include a first group of bits indicating to the valve controller 102 that the first flow control member 106 of the first valve 104 is to be in a closed position, and a second group of bits indicating to the valve controller 102 that the second flow control member 110 of the second valve 108 is to be in a fully-closed (e.g., 0% open) position.

In some examples, the valve controller 102 may access (e.g., from a memory of the valve controller 102) a correlation list, table and/or matrix that correlates and/or associates one or more parameter(s) (e.g., a current and/or amperage, a sequence of one or more bit value(s), etc.) of the coordinated control signal 122 of FIG. 1 with respective desired positions of corresponding ones of the first flow control member 106 of the first valve 104 and the second flow control member 110 of the second valve 108. The correlation list, table and/or matrix utilized by the valve controller 102 may be of any format and may include any number of factors and/or fields.

Based on the received coordinated control signal 122, the valve controller 102 of FIG. 1 transmits a first example control signal 124 to the first valve 104 (e.g., via the first actuator 112) to control the position of the first valve 104, and further transmits a second example control signal 126 to the second valve 108 (e.g., via the second actuator 114) to control the position of the second valve 108. For example, the first control signal 124 transmitted by the valve controller 102 may cause the first actuator 112 to move and/or adjust a position of the first flow control member 106 of the first valve 104 to match a desired position (e.g., a closed position) indicated by the first control signal 124, and the second control signal 126 transmitted by the valve controller 102 may cause the second actuator 114 to move and/or adjust a position of the second flow control member 110 of the second valve 108 to match a desired position (e.g., a closed position) indicated by the second control signal 126. Thus, the valve controller 102 of FIG. 1 controls multiple valves (e.g., the first valve 104 and the second valve 108) as a single valve based on and/or in response to the coordinated control signal 122 received from the PLC 118 and/or, more generally, from the control system 116.

In some examples, the first control signal 124 of FIG. 1 is a discrete signal that causes the first actuator 112 to rapidly change the position of the first flow control member 106 of the first valve 104 (e.g., an isolation valve) from a fully-open position (e.g., 100% open) to a fully-closed position (e.g., 0% open). In some examples, the second control signal 126 of FIG. 1 is a modulating signal that causes the second actuator 114 to change the position of the second flow control member 110 of the second valve 108 (e.g., a control valve) from a first position (e.g., 100% open, 80% open, etc.) to a second position (e.g., 5% open, 0% open, etc.).

In the illustrated example of FIG. 1, when the coordinated control signal 122 includes a set point corresponding to a fully-closed position, the first control signal 124 transmitted by the valve controller 102 causes the first valve 104 (e.g., an isolation valve) to shut off the process fluid traveling in the flow direction 120. As a result of the first valve 104 shutting off the flow of the process fluid, the second valve 108 (e.g., a control valve) is protected from excessive wear that might otherwise occur if the second valve 108 were to attempt to shut off the flow of the process fluid.

In the illustrated example of FIG. 1, a first example transmitter 128 is operatively positioned between the first valve 104 and the second valve 108. The first transmitter 128 may sense, measure and/or detect process data (e.g., one or more pressure value(s), one or more flow value(s), one or more temperature value(s), etc.) between the first valve 104 and the second valve 108. For example, when implemented as a pressure transmitter, the first transmitter 128 may sense, measure and/or detect pressure data corresponding to the pressure and/or lack of pressure between the first valve 104 and the second valve 108. The first transmitter 128 may transmit the process data (e.g. via a wired or wireless connection) to the valve controller 102 and/or the control system 116. In some examples, the transmitted process data may include and/or be indicative of diagnostic information corresponding to the availability of the second valve 108 for servicing. For example, pressure data corresponding to a lack of pressure sensed, measured and/or detected at the first transmitter 128 may be indicative of the first valve 104 having successfully shut off the flow of the process fluid (e.g., such that the process fluid is no longer flowing through the first valve 104 to the second valve 108), thus making the second valve 108 available for servicing.

While an example manner of implementing the example valve controller 102 is illustrated in FIG. 1, one or more of the elements, processes and/or devices illustrated in FIG. 1 may be combined, divided, re-arranged, omitted, eliminated and/or implemented in any other way. Further, the valve controller 102 of FIG. 1 may be implemented by hardware, software, firmware and/or any combination of hardware, software and/or firmware. Thus, for example, the valve controller 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, the valve controller 102 is hereby expressly defined to include a tangible computer readable storage device or storage disk such as a memory, a digital versatile disk (DVD), a compact disk (CD), a Blu-ray disk, etc. storing the software and/or firmware. Further still, the example valve controller 102 of FIG. 1 may include one or more elements, processes and/or devices in addition to, or instead of, those illustrated in FIG. 1, and/or may include more than one of any or all of the illustrated elements, processes and devices.

Figure 2:
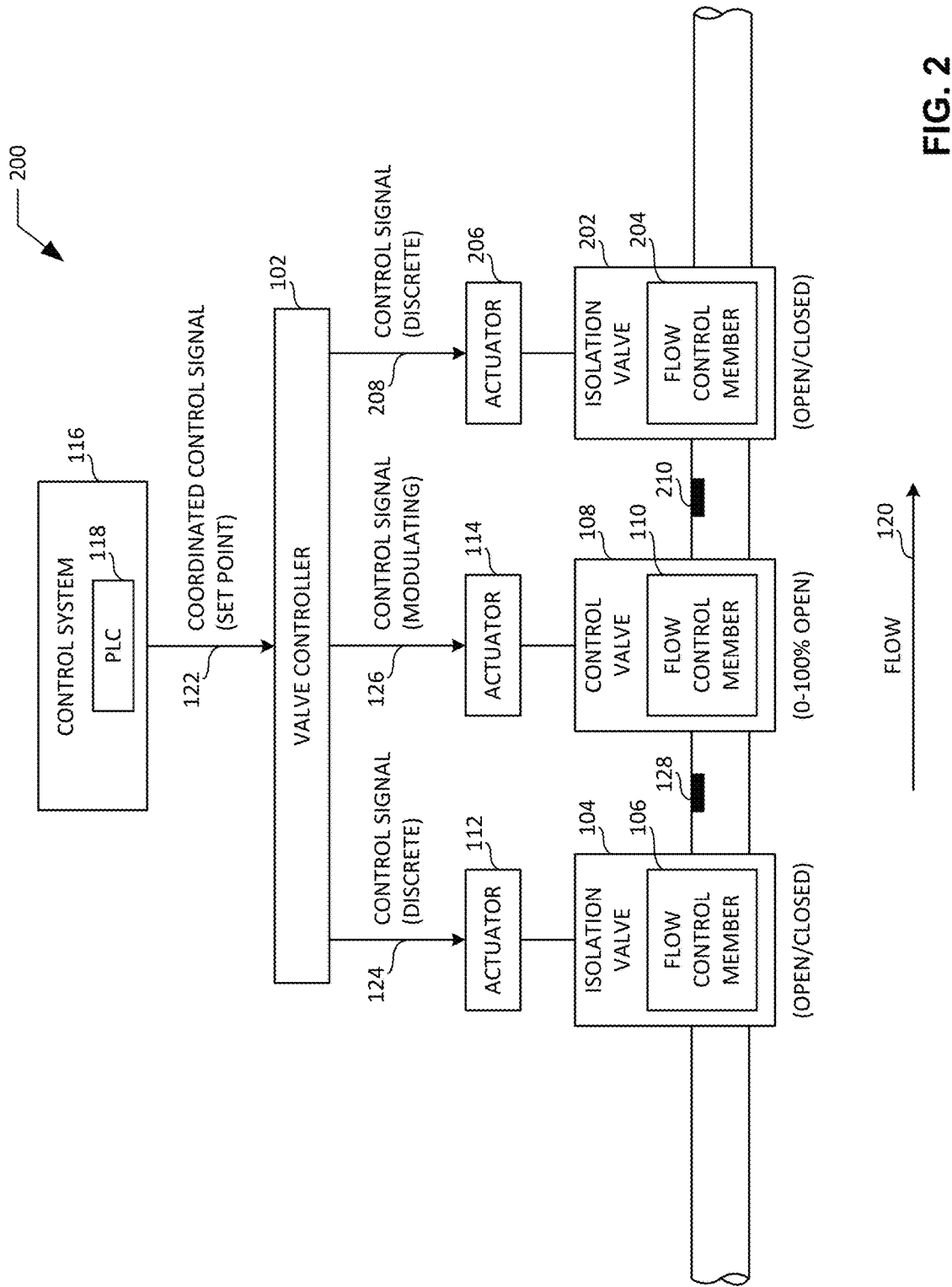
FIG. 2 is a second example process control environment including the example valve controller of FIG. 1.

FIG. 2 is a second example process control environment 200 including the example valve controller 102 of FIG. 1. In the illustrated example of FIG. 2, the process control environment 200 includes the valve controller 102, the first valve 104, first flow control member 106, the second valve 108, the second flow control member 110, the first actuator 112, the second actuator 114, the control system 116, the PLC 118, the flow direction 120, the coordinated control signal 122, the first control signal 124, the second control signal 126, and the first transmitter 128 of the first example process control environment 100 of FIG. 1 described above, and further includes a third example valve 202 having a third example flow control member 204, a third example actuator 206, a third example control signal 208, and a second example transmitter 210.

In the illustrated example of FIG. 2, the valve controller 102 is operatively coupled to the first actuator 112, the second actuator 114, the third actuator 206 and the control system 116. The valve controller 102 of FIG. 2 is also operatively coupled to the first valve 104 via the first actuator 112, to the second valve 108 via the second actuator 114, and to the third valve 202 via the third actuator 206. Thus, the valve controller 102 of FIG. 2 may control the first valve 104, the second valve 108 and/or the third valve 202 via communications (e.g., signals, messages, etc.) transmitted from the valve controller 102 to the corresponding first actuator 112, the corresponding second actuator 114 and/or the corresponding third actuator 206.

For example, in response to a control signal (e.g., a pneumatic control signal, a hydraulic control signal, an electrical control signal, etc.) transmitted from the valve controller 102 to the first actuator 112 (e.g., a pneumatic actuator, a hydraulic actuator, a solenoid, etc.), the first actuator 112 moves and/or adjusts a position of the first flow control member 106 (e.g., a plug, a disk, a ball, etc.) of the first valve 104 such that the position of the first flow control member 106 matches a desired position (e.g., a closed position) indicated by the control signal. As another example, in response to a control signal (e.g., a pneumatic control signal, a hydraulic control signal, an electrical control signal, etc.) transmitted from the valve controller 102 to the second actuator 114 (e.g., a pneumatic actuator, a hydraulic actuator, a solenoid, etc.), the second actuator 114 moves and/or adjusts a position of the second flow control member 110 (e.g., a plug, a disk, a ball, etc.) of the second valve 108 such that the position of the second flow control member 110 matches a desired position (e.g., a closed position) indicated by the control signal. As another example, in response to a control signal (e.g., a pneumatic control signal, a hydraulic control signal, an electrical control signal, etc.) transmitted from the valve controller 102 to the third actuator 206 (e.g., a pneumatic actuator, a hydraulic actuator, a solenoid, etc.), the third actuator 206 moves and/or adjusts a position of the third flow control member 204 (e.g., a plug, a disk, a ball, etc.) of the third valve 202 such that the position of the third flow control member 204 matches a desired position (e.g., a closed position) indicated by the control signal.

In the illustrated example of FIG. 2, the second valve 108 is operatively positioned in series with the first valve 104 and the third valve 202 such that the second valve 108 is operatively positioned between the first valve 104 and the third valve 202. For example, the second valve 108 may be positioned in series with the first valve 104 and the third valve 202 such that a process fluid traveling in the flow direction 120 as shown in FIG. 2 passes through the first valve 104, then through the second valve 108, and then through the third valve 202 when the first valve 104, second valve 108 and third valve 202 are all in an open position. In the illustrated example of FIG. 2, the first valve 104 is an isolation valve, the second valve 108 is a control valve, and the third valve 202 is an isolation valve. In other examples, the first valve 104 may be a type of valve other than an isolation valve (e.g., a control valve, etc.), the second valve 108 may be a type of valve other than a control valve (e.g., an isolation valve, etc.), and the third valve 202 may be a type of valve other than an isolation valve (e.g., a control valve, etc.). Although the example process control environment 200 of FIG. 2 illustrates a specific number of valves, specific valve types, and a specific arrangement of the valve types relative to one another, in other examples the process control environment may include any number of additional valves, any number of valve types, and any arrangement of the valve types relative to one another.

The valve controller 102 of FIG. 2 controls a position of the first valve 104, a position of the second valve 108, and a position of the third valve 202 based on the coordinated control signal 122 received by the valve controller 102 from the PLC 118 and/or, more generally, from the control system 116. In some examples, the coordinated control signal 122 corresponds to a set point associated with a position of the first valve 104 (e.g., a desired position of the first valve 104), a set point associated with a position of the second valve 108 (e.g., a desired position of the second valve 108), and/or a set point associated with a position of the third valve 202 (e.g., a desired position of the third valve 202). In the illustrated example of FIG. 2, the coordinated control signal 122 includes and/or carries data and/or information constituting and/or indicative of respective control signals to control the respective positions of corresponding ones of the first flow control member 106 of the first valve 104, the second flow control member 110 of the second valve 108, and the third flow control member 204 of the third valve 202.

For example, if the coordinated control signal 122 of FIG. 2 is implemented as an analog signal, a first instance of the analog coordinated control signal 122 measuring twenty milliamps (20 mA) may indicate to the valve controller 102 that the first flow control member 106 of the first valve 104 is to be in an open position, that the second flow control member 110 of the second valve 108 is to be in a fully-open (e.g., 100% open) position, and that the third flow control member 204 of the third valve 202 is to be in an open position. A second instance of the analog coordinated control signal 122 measuring twelve milliamps (12 mA) may indicate to the valve controller 102 that the first flow control member 106 of the first valve 104 is to be in an open position, that the second flow control member 110 of the second valve 108 is to be in a partially-open and/or partially-closed (e.g., 50% open) position, and that the third flow control member 204 of the third valve 202 is to be in an open position. A third instance of the analog coordinated control signal 122 measuring four milliamps (4 mA) may indicate to the valve controller 102 that the first flow control member 106 of the first valve 104 is to be in a closed position, that the second flow control member 110 of the second valve 108 is to be in a fully-closed (e.g., 0% open) position, and that the third flow control member 204 of the third valve 202 is to be in a closed position.

If the coordinated control signal 122 of FIG. 2 is instead implemented as a digital signal, a first group of bits (e.g., one or more bits) of the digital signal may indicate a desired position of the first flow control member 106 of the first valve 104, a second group of bits of the digital signal may indicate a desired position of the second flow control member 110 of the second valve 108, and a third group of bits of the digital signal may indicate a desired position of the third flow control member 204 of the third valve 202. For example, a first instance of the digital coordinated control signal 122 coded in a first manner may include a first group of bits indicating to the valve controller 102 that the first flow control member 106 of the first valve 104 is to be in an open position, a second group of bits indicating to the valve controller 102 that the second flow control member 110 of the second valve 108 is to be in a fully-open (e.g., 100% open) position, and a third group of bits indicating to the valve controller 102 that the third flow control member 204 of the third valve 202 is to be in an open position. A second instance of the digital coordinated control signal 122 coded in a second manner may include a first group of bits indicating to the valve controller 102 that the first flow control member 106 of the first valve 104 is to be in an open position, a second group of bits indicating to the valve controller 102 that the second flow control member 110 of the second valve 108 is to be in a partially-open and/or partially-closed (e.g., 50% open) position, and a third group of bits indicating to the valve controller 102 that the third flow control member 204 of the third valve 202 is to be in an open position. A third instance of the digital coordinated control signal 122 coded in a third manner may include a first group of bits indicating to the valve controller 102 that the first flow control member 106 of the first valve 104 is to be in a closed position, a second group of bits indicating to the valve controller 102 that the second flow control member 110 of the second valve 108 is to be in a fully-closed (e.g., 0% open) position, and a third group of bits indicating to the valve controller 102 that the third flow control member 204 of the third valve 202 is to be in a closed position.

In some examples, the valve controller 102 may access (e.g., from a memory of the valve controller 102) a correlation list, table and/or matrix that correlates and/or associates one or more parameter(s) (e.g., a current and/or amperage, a sequence of one or more bit value(s), etc.) of the coordinated control signal 122 of FIG. 2 with respective desired positions of corresponding ones of the first flow control member 106 of the first valve 104, the second flow control member 110 of the second valve 108, and the third flow control member 204 of the third valve 202. The correlation list, table and/or matrix utilized by the valve controller 102 may be of any format and may include any number of factors and/or fields.

Based on the received coordinated control signal 122, the valve controller 102 of FIG. 2 transmits the first control signal 124 to the first valve 104 (e.g., via the first actuator 112) to control the position of the first valve 104, transmits the second control signal 126 to the second valve 108 (e.g., via the second actuator 114) to control the position of the second valve 108, and further transmits the third control signal 208 to the third valve 202 (e.g., via the third actuator 206) to control the position of the third valve 202. For example, the first control signal 124 transmitted by the valve controller 102 may cause the first actuator 112 to move and/or adjust a position of the first flow control member 106 of the first valve 104 to match a desired position (e.g., a closed position) indicated by the first control signal 124, the second control signal 126 transmitted by the valve controller 102 may cause the second actuator 114 to move and/or adjust a position of the second flow control member 110 of the second valve 108 to match a desired position (e.g., a closed position) indicated by the second control signal 126, and the third control signal 208 transmitted by the valve controller 102 may cause the third actuator 206 to move and/or adjust a position of the third flow control member 204 of the third valve 202 to match a desired position (e.g., a closed position) indicated by the third control signal 208. Thus, the valve controller 102 of FIG. 2 controls multiple valves (e.g., the first valve 104, the second valve 108, and the third valve 202) as a single valve based on and/or in response to the coordinated control signal 122 received from the PLC 118 and/or, more generally, from the control system 116.

In some examples, the first control signal 124 of FIG. 2 is a discrete signal that causes the first actuator 112 to rapidly change the position of the first flow control member 106 of the first valve 104 (e.g., an isolation valve) from a fully-open position (e.g., 100% open) to a fully-closed position (e.g., 0% open). In some examples, the second control signal 126 of FIG. 2 is a modulating signal that causes the second actuator 114 to change the position of the second flow control member 110 of the second valve 108 (e.g., a control valve) from a first position (e.g., 100% open, 80% open, etc.) to a second position (e.g., 5% open, 0% open, etc.). In some examples, the third control signal 208 of FIG. 2 is a discrete signal that causes the third actuator 206 to rapidly change the position of the third flow control member 204 of the third valve 202 (e.g., an isolation valve) from a fully-open position (e.g., 100% open) to a fully-closed position (e.g., 0% open).

In the illustrated example of FIG. 2, when the coordinated control signal 122 includes a set point corresponding to a fully-closed position, the first control signal 124 transmitted by the valve controller 102 causes the first valve 104 (e.g., an isolation valve) to shut off the process fluid traveling in the flow direction 120, and the third control signal 208 transmitted by the valve controller 102 causes the third valve 202 (e.g., an isolation valve) to similarly shut off the flow of the process fluid. As a result of the first valve 104 and the third valve 202 shutting off the flow of the process fluid, the second valve 108 (e.g., a control valve) is protected from excessive wear that might otherwise occur if the second valve 108 were to attempt to shut off the flow of the process fluid.

In the illustrated example of FIG. 2, the first transmitter 128 is operatively positioned between the first valve 104 and the second valve 108, and the second transmitter 210 is operatively positioned between the second valve 108 and the third valve 202. The first transmitter 128 may sense, measure and/or detect first process data (e.g., one or more pressure value(s), one or more flow value(s), one or more temperature value(s), etc.) between the first valve 104 and the second valve 108, and the second transmitter 210 may sense, measure and/or detect second process data (e.g., one or more pressure value(s), one or more flow value(s), one or more temperature value(s), etc.) corresponding to the pressure and/or lack of pressure between the second valve 108 and the third valve 202. For example, when the first transmitter 128 and the second transmitter 210 are respectively implemented as pressure transmitters, the first transmitter 128 may sense, measure and/or detect first pressure data corresponding to the pressure and/or lack of pressure between the first valve 104 and the second valve 108, and the second transmitter 210 may sense, measure and/or detect second pressure data corresponding to the pressure and/or lack of pressure between the second valve 108 and the third valve 202. The first transmitter 128 and the second transmitter 210 may respectively transmit the first and second process data (e.g. via wired or wireless connections) to the valve controller 102 and/or the control system 116. In some examples, the first and second process data may include and/or be indicative of diagnostic information corresponding to the availability of the second valve 108 for servicing. For example, first and second pressure data respectively corresponding to a lack of pressure sensed, measured and/or detected at the first transmitter 128 and the second transmitter 210 may be indicative of the first valve 104 and the third valve 202 having successfully shut off the flow of the process fluid (e.g., such that the process fluid is no longer flowing between the first valve 104 and the second valve 108, and/or between the second valve 108 and the third valve 202), thus making the second valve 108 available for servicing.

While an example manner of implementing the example valve controller 102 is illustrated in FIG. 2, one or more of the elements, processes and/or devices illustrated in FIG. 2 may be combined, divided, re-arranged, omitted, eliminated and/or implemented in any other way. Further, the valve controller 102 of FIG. 2 may be implemented by hardware, software, firmware and/or any combination of hardware, software and/or firmware. Thus, for example, the valve controller 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, the valve controller 102 is hereby expressly defined to include a tangible computer readable storage device or storage disk such as a memory, a digital versatile disk (DVD), a compact disk (CD), a Blu-ray disk, etc. storing the software and/or firmware. Further still, the example valve controller 102 of FIG. 2 may include one or more elements, processes and/or devices in addition to, or instead of, those illustrated in FIG. 2, and/or may include more than one of any or all of the illustrated elements, processes and devices.

Figure 3:
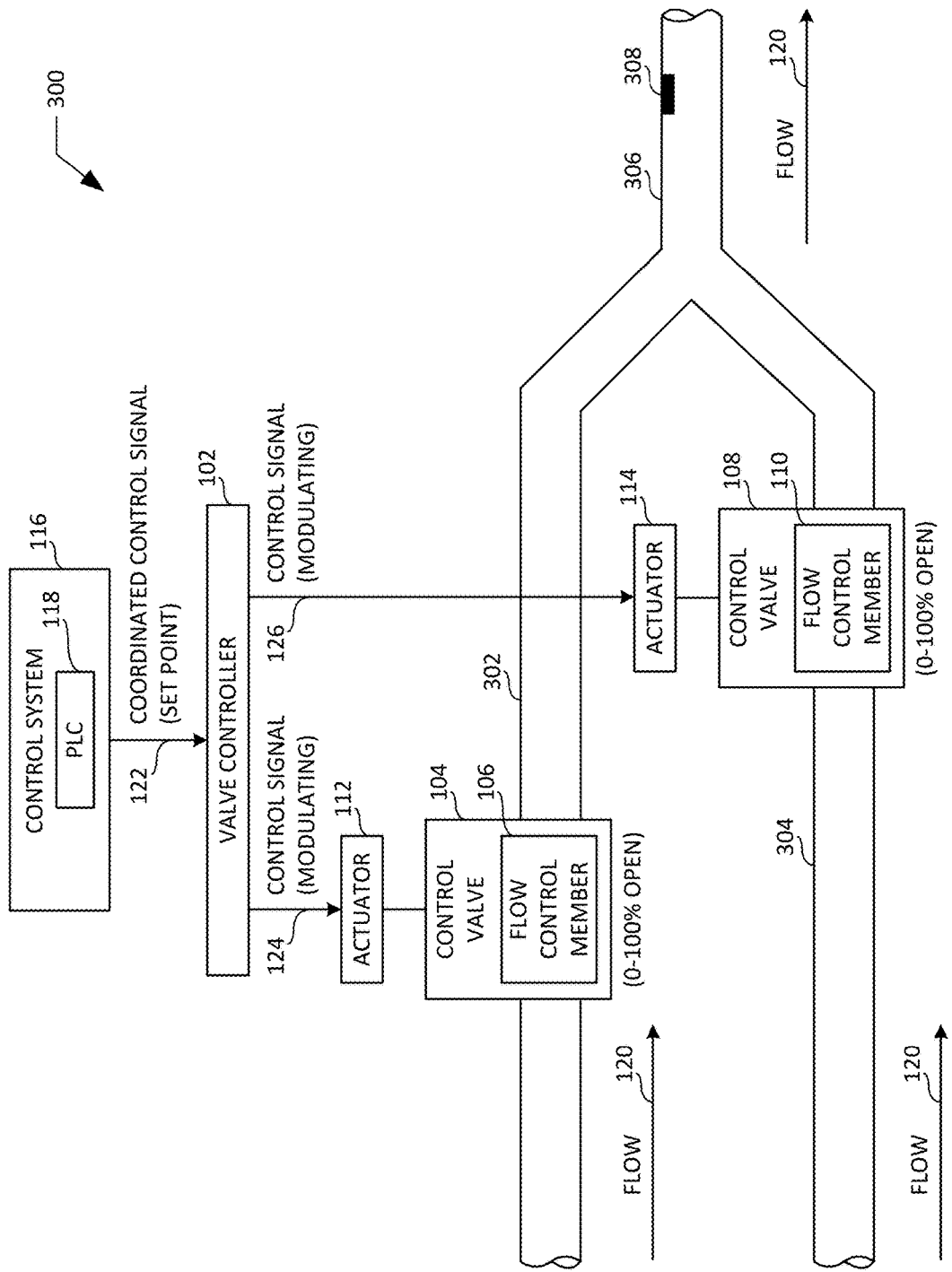
FIG. 3 is a third example process control environment including the example valve controller of FIG. 1.

FIG. 3 is a third example process control environment 300 including the example valve controller 102 of FIG. 1. In the illustrated example of FIG. 3, the process control environment 300 includes the valve controller 102, the first valve 104, first flow control member 106, the second valve 108, the second flow control member 110, the first actuator 112, the second actuator 114, the control system 116, the PLC 118, the flow direction 120, the coordinated control signal 122, the first control signal 124, and the second control signal 126 of the first example process control environment 100 of FIG. 1 described above. In the third example process control environment 300 of FIG. 3, however, the second valve 108 is operatively positioned in parallel with the first valve 104, as further described below.

In the illustrated example of FIG. 3, the valve controller 102 is operatively coupled to the first actuator 112, the second actuator 114, and the control system 116. The valve controller 102 is also operatively coupled to the first valve 104 via the first actuator 112, and to the second valve 108 via the second actuator 114. Thus, the valve controller 102 of FIG. 3 may control the first valve 104 and/or the second valve 108 via communications (e.g., signals, messages, etc.) transmitted from the valve controller 102 to the corresponding first actuator 112 and/or the corresponding second actuator 114.

For example, in response to a control signal (e.g., a pneumatic control signal, a hydraulic control signal, an electrical control signal, etc.) transmitted from the valve controller 102 to the first actuator 112 (e.g., a pneumatic actuator, a hydraulic actuator, a solenoid, etc.), the first actuator 112 moves and/or adjusts a position of the first flow control member 106 (e.g., a plug, a disk, a ball, etc.) of the first valve 104 such that the position of the first flow control member 106 matches a desired position (e.g., a partially-closed position) indicated by the control signal. As another example, in response to a control signal (e.g., a pneumatic control signal, a hydraulic control signal, an electrical control signal, etc.) transmitted from the valve controller 102 to the second actuator 114 (e.g., a pneumatic actuator, a hydraulic actuator, a solenoid, etc.), the second actuator 114 moves and/or adjusts a position of the second flow control member 110 (e.g., a plug, a disk, a ball, etc.) of the second valve 108 such that the position of the second flow control member 110 matches a desired position (e.g., a partially-closed position) indicated by the control signal.

In the illustrated example of FIG. 3, the second valve 108 is operatively positioned in parallel with the first valve 104. For example, the second valve 108 may be positioned in parallel with the first valve 104 such that a first process fluid traveling in an example flow direction 120 within an example first flow line 302 of FIG. 3 passes through the first valve 104, a second process fluid traveling in the flow direction 120 within an example second flow line 304 of FIG. 3 passes through the second valve 108, and the first and the second process fluids respectively travelling through the first and second flow lines 302, 304 merge together at an example blended flow line 306 of FIG. 3. In the illustrated example of FIG. 3, the first valve 104 and the second valve 108 are both control valves. In other examples, the first valve 104 and/or the second valve 108 may be a type of valve other than a control valve (e.g., an isolation valve, etc.). Although the example process control environment 300 of FIG. 3 illustrates a specific number of valves, specific valve types, and a specific arrangement of the valve types relative to one another, in other examples the process control environment may include any number of additional valves, any number of valve types, and any arrangement of the valve types relative to one another.

The valve controller 102 of FIG. 3 controls a position of the first valve 104 and a position of the second valve 108 based on an example coordinated control signal 122 received by the valve controller 102 from the PLC 118 and/or, more generally, from the control system 116. In some examples, the coordinated control signal 122 corresponds to a set point associated with a position of the first valve 104 (e.g., a desired position of the first valve 104) and/or a set point associated with a position of the second valve 108 (e.g., a desired position of the second valve 108). In some examples, the coordinated control signal 122 and/or the set point may additionally and/or alternatively be associated with a process flow variable (e.g., temperature, density, viscosity, opacity, etc.) of the merged first and second process fluids traveling through the blended flow line 306 of FIG. 3. In the illustrated example of FIG. 3, the coordinated control signal 122 includes and/or carries data and/or information constituting and/or indicative of respective control signals to control the respective positions of corresponding ones of the first flow control member 106 of the first valve 104 and the second flow control member 110 of the second valve 108.

For example, if the coordinated control signal 122 of FIG. 3 is implemented as an analog signal, a first instance of the analog coordinated control signal 122 measuring twenty milliamps (20 mA) may indicate to the valve controller 102 that the first flow control member 106 of the first valve 104 is to be in a fully-open (e.g., 100% open) position and that the second flow control member 110 of the second valve 108 is also to be in a fully-open (e.g., 100% open) position. A second instance of the analog coordinated control signal 122 measuring twelve milliamps (12 mA) may indicate to the valve controller 102 that the first flow control member 106 of the first valve 104 is to be in a fully-open (e.g., 100% open) position and that the second flow control member 110 of the second valve 108 is to be in a fully-closed (e.g., 0% open) position. A third instance of the analog coordinated control signal 122 measuring four milliamps (4 mA) may indicate to the valve controller 102 that the first flow control member 106 of the first valve 104 is to be in a fully-closed (e.g., 0% open) closed position and that the second flow control member 110 of the second valve 108 is to be in a fully-open (e.g., 100% open) position.

If the coordinated control signal 122 of FIG. 3 is instead implemented as a digital signal, a first group of bits (e.g., one or more bits) of the digital signal may indicate a desired position of the first flow control member 106 of the first valve 104, and a second group of bits of the digital signal may indicate a desired position of the second flow control member 110 of the second valve 108. For example, a first instance of the digital coordinated control signal 122 coded in a first manner may include a first group of bits indicating to the valve controller 102 that the first flow control member 106 of the first valve 104 is to be in a fully-open (e.g., 100% open) position, and a second group of bits indicating to the valve controller 102 that the second flow control member 110 of the second valve 108 is to be in a fully-open (e.g., 100% open) position. A second instance of the digital coordinated control signal 122 coded in a second manner may include a first group of bits indicating to the valve controller 102 that the first flow control member 106 of the first valve 104 is to be in a fully-open (e.g., 100% open) position, and a second group of bits indicating to the valve controller 102 that the second flow control member 110 of the second valve 108 is to be in a fully-closed (e.g., 0% open) position. A third instance of the digital coordinated control signal 122 coded in a third manner may include a first group of bits indicating to the valve controller 102 that the first flow control member 106 of the first valve 104 is to be in a fully-closed (e.g., 0% open) position, and a second group of bits indicating to the valve controller 102 that the second flow control member 110 of the second valve 108 is to be in a fully-open (e.g., 100% open) position.

In some examples, the valve controller 102 may access (e.g., from a memory of the valve controller 102) a correlation list, table and/or matrix that correlates and/or associates one or more parameter(s) (e.g., a current and/or amperage, a sequence of one or more bit value(s), etc.) of the coordinated control signal 122 of FIG. 3 with respective desired positions of corresponding ones of the first flow control member 106 of the first valve 104 and the second flow control member 110 of the second valve 108. The correlation list, table and/or matrix utilized by the valve controller 102 may be of any format and may include any number of factors and/or fields.

Based on the received coordinated control signal 122, the valve controller 102 of FIG. 3 transmits a first example control signal 124 to the first valve 104 (e.g., via the first actuator 112) to control the position of the first valve 104, and further transmits a second example control signal 126 to the second valve 108 (e.g., via the second actuator 114) to control the position of the second valve 108. For example, the first control signal 124 transmitted by the valve controller 102 may cause the first actuator 112 to move and/or adjust a position of the first flow control member 106 of the first valve 104 to match a desired position (e.g., a partially-closed position) indicated by the first control signal 124, and the second control signal 126 transmitted by the valve controller 102 may cause the second actuator 114 to move and/or adjust a position of the second flow control member 110 of the second valve 108 to match a desired position (e.g., a fully-open position) indicated by the second control signal 126. Thus, the valve controller 102 of FIG. 1 controls multiple valves (e.g., the first valve 104 and the second valve 108) as a single valve based on and/or in response to the coordinated control signal 122 received from the PLC 118 and/or, more generally, from the control system 116.

In some examples, the first control signal 124 of FIG. 3 is a modulating signal that causes the first actuator 112 to change the position of the first flow control member 106 of the first valve 104 (e.g., a control valve) from a first position (e.g., 100% open, 80% open, etc.) to a second position (e.g., 5% open, 0% open, etc.). In some examples, the second control signal 126 of FIG. 3 is a modulating signal that causes the second actuator 114 to change the position of the second flow control member 110 of the second valve 108 (e.g., a control valve) from a first position (e.g., 100% open, 80% open, etc.) to a second position (e.g., 5% open, 0% open, etc.).

In the illustrated example of FIG. 3, when the coordinated control signal 122 includes a set point corresponding to a fully-open position of the first valve 104 and a fully-closed position of the second valve 108, the merged process fluid traveling through the blended flow line 306 of FIG. 3 will demonstrate process flow variables (e.g., temperature, density, viscosity, opacity, etc.) corresponding primarily to the process flow variables of the first process fluid traveling through the first flow line 302 of FIG. 3. When the coordinated control signal 122 includes a set point corresponding to a fully-closed position of the first valve 104 and a fully-open position of the second valve 108, the merged process fluid traveling through the blended flow line 306 of FIG. 3 will instead demonstrate process flow variables (e.g., temperature, density, viscosity, opacity, etc.) corresponding primarily to the process flow variables of the second process fluid traveling through the second flow line 304 of FIG. 3. Thus, based on the coordinated control signal 122, the valve controller 102 of FIG. 3 may accordingly control the first and second valves 104, 108 of FIG. 3 to regulate a process flow variable associated with the merged process fluid traveling through the blended flow line 306 of FIG. 3.

In the illustrated example of FIG. 3, an example transmitter 308 is operatively positioned downstream from the first valve 104 and the second valve 108 within the blended flow line 306 of FIG. 3. The transmitter 308 may sense, measure and/or detect process data (e.g., one or more pressure value(s), one or more flow value(s), one or more temperature value(s), one or more density value(s), one or more viscosity value(s), one or more opacity value(s), etc.) of the merged process fluid traveling through the blended flow line 306 of FIG. 3. For example, when implemented as a temperature transmitter, the transmitter 308 may sense, measure and/or detect temperature data corresponding to the temperature of the merged process fluid traveling through the blended flow line 306 of FIG. 3. The transmitter 308 may transmit the process data (e.g. via a wired or wireless connection) to the valve controller 102 and/or the control system 116. In some examples, the transmitted process data (e.g., a measured and/or sensed temperature value) may be compared (e.g., via the control system 116) to a process data set point (e.g., a temperature set point). In instances when the transmitted process data does not match the process data set point, the control system 116 may respond by generating a coordinated control signal to modulate the respective positions of the first and/or second valves 104, 108 of FIG. 3 to cause the merged process fluid traveling though the blended flow line 306 of FIG. 3 to demonstrate the desired process data (e.g., process data that matches the process data set point).

While an example manner of implementing the example valve controller 102 is illustrated in FIG. 3, one or more of the elements, processes and/or devices illustrated in FIG. 3 may be combined, divided, re-arranged, omitted, eliminated and/or implemented in any other way. Further, the valve controller 102 of FIG. 3 may be implemented by hardware, software, firmware and/or any combination of hardware, software and/or firmware. Thus, for example, the valve controller 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, the valve controller 102 is hereby expressly defined to include a tangible computer readable storage device or storage disk such as a memory, a digital versatile disk (DVD), a compact disk (CD), a Blu-ray disk, etc. storing the software and/or firmware. Further still, the example valve controller 102 of FIG. 3 may include one or more elements, processes and/or devices in addition to, or instead of, those illustrated in FIG. 3, and/or may include more than one of any or all of the illustrated elements, processes and devices.

Figure 4:
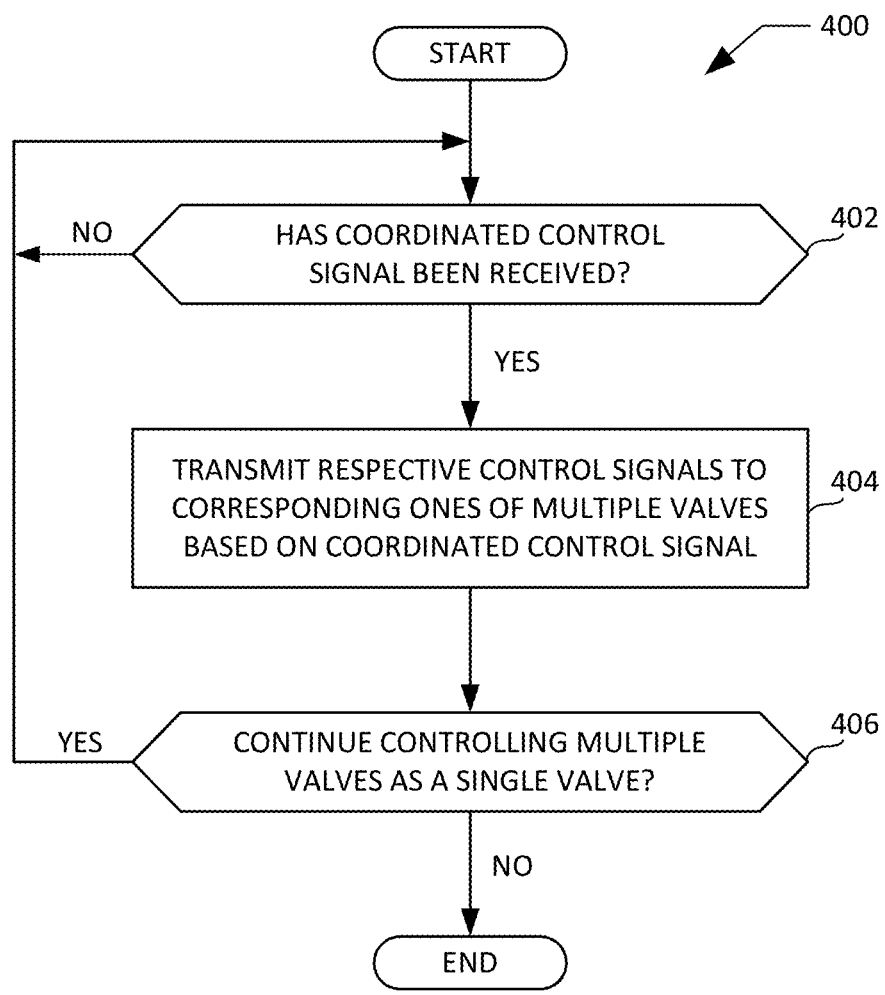
FIG. 4 is a flowchart representative of an example method that may be executed at the example valve controller of FIGS. 1, 2 and/or 3 to control multiple valves as a single valve based on a coordinated control signal.

A flowchart representative of an example method for controlling multiple valves as a single valve based on a coordinated control signal is shown in FIG. 4. In this example, the method may be implemented using machine-readable instructions that comprise one or more program(s) for execution by a controller or processor such as the example processor 502 shown in the example processor platform 500 discussed below in connection with FIG. 5. The one or more program(s) may be embodied in software stored on a tangible computer readable storage medium such as a CD-ROM, a floppy disk, a hard drive, a digital versatile disk (DVD), a Blu-ray disk, or a memory associated with the processor 502, but the entire program(s) and/or parts thereof could alternatively be executed by a device other than the processor 502 and/or embodied in firmware or dedicated hardware. Further, although the example program(s) is/are described with reference to the flowchart illustrated in FIG. 4, many other methods for controlling multiple valves as a single valve based on a coordinated control signal may alternatively be used. For example, the order of execution of the blocks may be changed, and/or some of the blocks described may be changed, eliminated, or combined.

As mentioned above, the example method of FIG. 4 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 4 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 4 is a flowchart representative of an example method 400 that may be executed at the example valve controller 102 of FIGS. 1, 2 and/or 3 to control multiple valves as a single valve based on a coordinated control signal. The example method 400 of FIG. 4 begins when the valve controller 102 of FIGS. 1, 2 and/or 3 determines whether a coordinated control signal has been received (block 402). For example, the valve controller 102 of FIGS. 1, 2 and/or 3 may determine that the coordinated control signal 122 of FIGS. 1, 2 and/or 3 has been received from the PLC 118 and/or, more generally, from the control system 116 of FIGS. 1, 2 and/or 3. In some examples, the coordinated control signal corresponds to a set point of one or more valve(s) (e.g., the first valve 104, the second valve 108, and/or the third valve 202 of FIGS. 1, 2 and/or 3) being controlled by the valve controller 102. If the valve controller 102 determines at block 402 that a coordinated control signal has not been received, control of the example method 400 remains at block 402. If the valve controller 102 instead determines at block 402 that a coordinated control signal has been received, control of the example method 400 proceeds to block 404.

At block 404, the valve controller 102 of FIGS. 1, 2 and/or 3 transmits respective control signals to corresponding ones of multiple valves based on the coordinated control signal (block 404). For example, based on and/or in response to the coordinated control signal 122 of FIGS. 1, 2 and/or 3, the valve controller 102 of FIGS. 1, 2 and/or 3 may transmit the first control signal 124 to the first valve 104 of FIGS. 1, 2 and/or 3 via the first actuator 112 of FIGS. 1, 2 and/or 3, may transmit the second control signal 126 of FIGS. 1, 2 and/or 3 to the second valve 108 of FIGS. 1, 2 and/or 3 via the second actuator 114 of FIGS. 1, 2 and/or 3, and may transmit the third control signal 208 of FIG. 2 to the third valve 202 of FIG. 2 via the third actuator 206 of FIG. 2. Following block 404, control of the example method 400 proceeds to block 406.

At block 406, the valve controller 102 of FIGS. 1, 2 and/or 3 determines whether to continue controlling the multiple valves as a single valve (block 406). For example, the valve controller 102 may receive one or more input(s), notification(s) and/or message(s) from the PLC 118 and/or, more generally, from the control system 116 of FIGS. 1, 2 and/or 3, indicating that the valve controller 102 is to continue controlling the multiple valves (e.g., the first valve 104, the second valve 108, and/or the third valve 202 of FIGS. 1, 2 and/or 3) as a single valve. If the valve controller 102 determines at block 406 to continue controlling the multiple valves as a single valve, control of the example method 400 returns to block 402. If the valve controller 102 instead determines at block 406 not to continue controlling the multiple valves as a single valve, the example method 400 ends.

Figure 5:
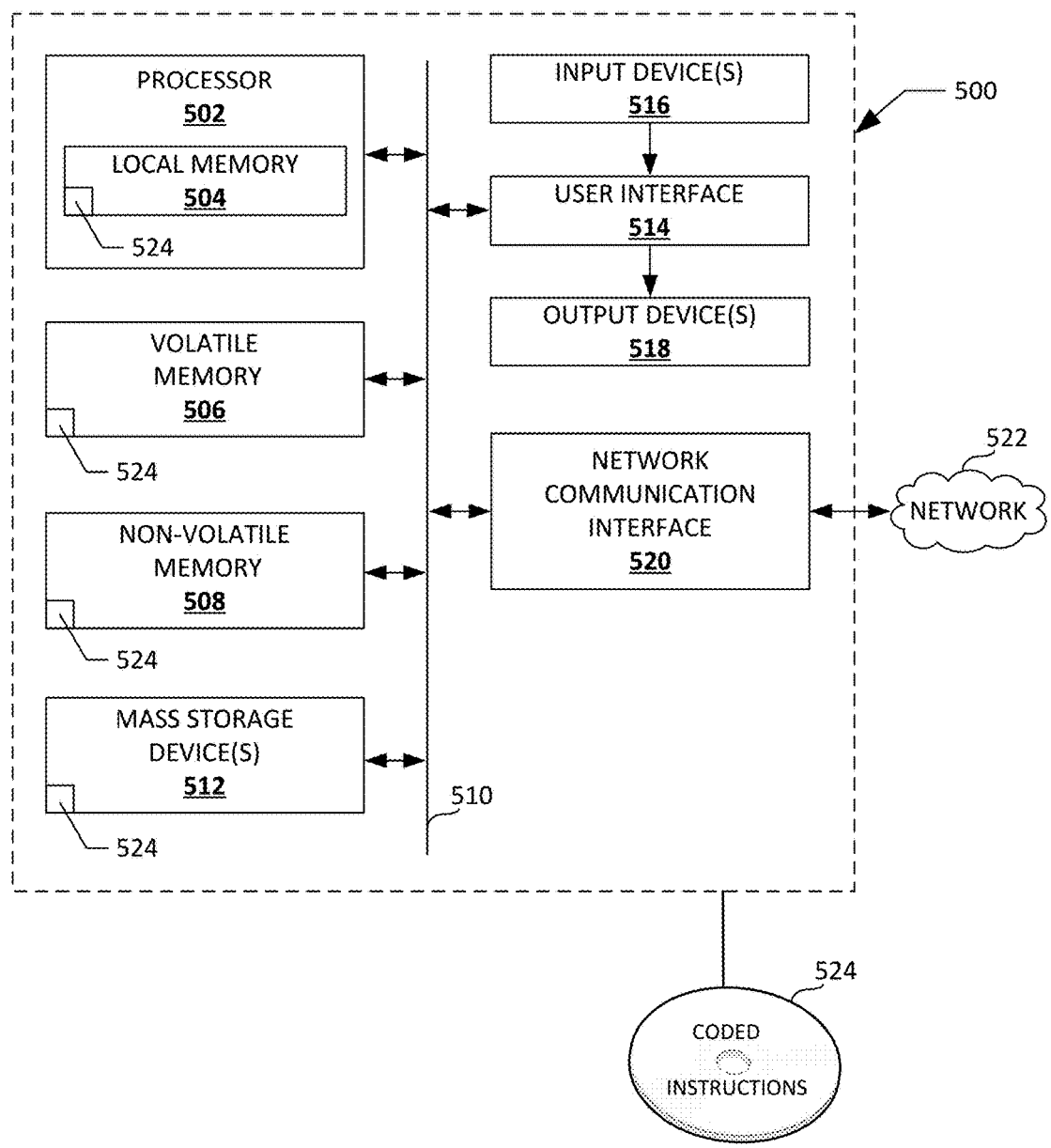
FIG. 5 is an example processor platform capable of executing instructions to implement the method of FIG. 4 and the example valve controller of FIGS. 1, 2 and/or 3.

FIG. 5 is an example processor platform 500 capable of executing instructions to implement the method 400 of FIG. 4 and the example valve controller 102 of FIGS. 1, 2 and/or 3. The processor platform 500 of the illustrated example includes an example processor 502. The processor 502 of the illustrated example is hardware. For example, the processor 502 can be implemented by one or more integrated circuits, logic circuits, microprocessors or controllers from any desired family or manufacturer. The processor 502 of the illustrated example includes a local memory 504 (e.g., a cache).

The processor 502 of the illustrated example is in communication with a main memory including a volatile memory 506 and a non-volatile memory 508 via a bus 510.

The volatile memory 506 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 508 may be implemented by flash memory and/or any other desired type of memory device. Access to the volatile memory 506 and the non-volatile memory 508 is controlled by a memory controller.

The processor 502 of the illustrated example is also in communication with one or more mass storage devices 512 for storing software and/or data. Examples of such mass storage devices 512 include floppy disk drives, hard drive disks, compact disk drives, Blu-ray disk drives, RAID systems, and digital versatile disk (DVD) drives.

The processor platform 500 of the illustrated example also includes a user interface circuit 514. The user interface circuit 514 may be implemented by any type of interface standard, such as an Ethernet interface, a universal serial bus (USB), and/or a PCI express interface. In the illustrated example, one or more example input device(s) 516 are connected to the user interface circuit 514. The input device(s) 516 permit(s) a user to enter data and commands into the processor 502. The input device(s) 516 can be implemented by, for example, one or more buttons, one or more switches, a keyboard, a mouse, a microphone and/or a liquid crystal display having a touchscreen. One or more example output device(s) 518 are also connected to the user interface circuit 514 of the illustrated example. The output device(s) 518 can be implemented, for example, by one or more light emitting diode(s) for presenting visual information, one or more speaker(s) for presenting audible information, and/or a display device (e.g., a liquid crystal display, a cathode ray tube display, etc.) for presenting textual and/or graphical information. The user interface circuit 514 of the illustrated example may, thus, include a graphics driver such as a graphics driver chip and/or processor.

The processor platform 500 of the illustrated example also includes a network communication interface circuit 520 to facilitate the exchange of data and/or signals with external machines via a network 522. In some examples, the network 522 may be facilitated via 4-20 mA wiring and/or via one or more communication protocol(s) including, for example, Foundation Fieldbus, Highway Addressable Remote Transducer (HART), Transmission Control Protocol/Internet Protocol (TCP/IP), Profinet, Modbus and/or Ethernet.

Coded instructions 524 for implementing the method 400 of FIG. 4 may be stored in the local memory 504, in the volatile memory 506, in the non-volatile memory 508, in the mass storage device 512, and/or on a removable tangible computer readable storage medium such as a CD or DVD.

From the foregoing, it will be appreciated that the disclosed methods and apparatus advantageously provide the ability to control multiple valves as a single valve based on a coordinated control signal. For example, because the disclosed methods and apparatus are able to control multiple valves (e.g., an isolation valve and a control valve) via a single valve controller, the introduction of one of the multiple valves (e.g., the isolation valve) to a process control environment including the disclosed valve controller does not require a corresponding introduction of an additional valve controller. Accordingly, the additional input/output channel of a control system that would otherwise be required when introducing such an additional valve controller may be reclaimed and/or repurposed. Any need for additional wiring and/or additional automated process control design work to operate the additional valve and/or the additional valve controller is also reduced relative to that which might be required when introducing an additional valve and/or an additional valve controller into a conventional process control environment as described above.

In some examples, an apparatus is disclosed. In some disclosed examples, the apparatus comprises a valve controller to be operatively coupled to a first valve and a second valve. In some disclosed examples, the second valve is to be operatively positioned in series with the first valve. In some disclosed examples, the valve controller is to control a position of the first valve and a position of the second valve based on a coordinated control signal to be received by the valve controller.

In some disclosed examples, the first valve is an isolation valve and the second valve is a control valve. In some disclosed examples, the coordinated control signal corresponds to a set point of at least the second valve. In some disclosed examples, the coordinated control signal is to be received by the valve controller from a programmable logic circuit or a control system.

In some disclosed examples, the valve controller is to control the position of the first valve based on a first control signal transmitted by the valve controller in response to the coordinated control signal. In some disclosed examples, the first control signal is a discrete signal. In some disclosed examples, the valve controller is to control the position of the second valve based on a second control signal transmitted by the valve controller in response to the coordinated control signal. In some disclosed examples, the second control signal is a modulating signal.

In some disclosed examples, the valve controller is further to be operatively coupled to a third valve. In some disclosed examples, the third valve is to be operatively positioned in series with the first valve and the second valve. In some disclosed examples, the second valve is to be operatively positioned between the first valve and the third valve. In some disclosed examples, the valve controller is to control a position of the third valve based on the coordinated control signal. In somAe disclosed examples, the third valve is an isolation valve. In some disclosed examples, the valve controller is to control the position of the third valve based on a third control signal transmitted by the valve controller in response to the coordinated control signal. In some disclosed examples, the third control signal is a discrete signal.

In some examples, a method is disclosed. In some disclosed examples, the method comprises controlling, via a valve controller, a position of a first valve and a position of a second valve based on a coordinated control signal received by the valve controller. In some disclosed examples, the valve controller is operatively coupled to the first valve and the second valve. In some disclosed examples, the second valve is operatively positioned in series with the first valve.

In some disclosed examples, the first valve is an isolation valve and the second valve is a control valve. In some disclosed examples, the coordinated control signal corresponds to a set point of at least the second valve. In some disclosed examples, the method further comprises receiving the coordinated control signal at the valve controller from a programmable logic circuit or a control system.

In some disclosed examples, controlling the position of the first valve includes transmitting, via the valve controller, a first control signal in response to the coordinated control signal. In some disclosed examples, the first control signal is a discrete signal. In some disclosed examples, controlling the position of the second valve includes transmitting, via the valve controller, a second control signal in response to the coordinated control signal. In some disclosed examples, the second control signal is a modulating signal.

In some disclosed examples, the method further comprises controlling, via the valve controller, a position of a third valve based on the coordinated control signal. In some disclosed examples, the valve controller is operatively coupled to the third valve. In some disclosed examples, the third valve is operatively positioned in series with the first valve and the second valve. In some disclosed examples, the second valve is operatively positioned between the first valve and the third valve. In some disclosed examples, the third valve is an isolation valve. In some disclosed examples, controlling the position of the third valve includes transmitting, via the valve controller, a third control signal in response to the coordinated control signal. In some disclosed examples, the third control signal is a discrete signal.

In some examples, a tangible machine readable storage medium is disclosed. In some disclosed examples, the tangible machine readable storage medium comprises instructions that, when executed, cause a valve controller to control a position of a first valve and a position of a second valve based on a coordinated control signal received by the valve controller. In some disclosed examples, the valve controller is operatively coupled to the first valve and the second valve. In some disclosed examples, the second valve is operatively positioned in series with the first valve.

In some disclosed examples, the first valve is an isolation valve and the second valve is a control valve. In some disclosed examples, the coordinated control signal corresponds to a set point of at least the second valve. In some disclosed examples, the coordinated control signal is received at the valve controller from a programmable logic circuit or a control system.

In some disclosed examples, the instructions, when executed, cause the valve controller to control the position of the first valve by transmitting, via the valve controller, a first control signal in response to the coordinated control signal. In some disclosed examples, the first control signal is a discrete signal. In some disclosed examples, the instructions, when executed, cause the valve controller to control the position of the second valve by transmitting, via the valve controller, a second control signal in response to the coordinated control signal. In some disclosed examples, the second control signal is a modulating signal.

In some disclosed examples, the instructions, when executed, cause the valve controller to control a position of a third valve based on the coordinated control signal. In some disclosed examples, the valve controller is operatively coupled to the third valve. In some disclosed examples, the third valve is operatively positioned in series with the first valve and the second valve. In some disclosed examples, the second valve is operatively positioned between the first valve and the third valve. In some disclosed examples, the third valve is an isolation valve. In some disclosed examples, the instructions, when executed, cause the valve controller to control the position of the third valve by transmitting, via the valve controller, a third control signal in response to the coordinated control signal. In some disclosed examples, the third control signal is a discrete signal.

Although certain example apparatus and methods have been disclosed herein, the scope of coverage of this patent is not limited thereto. On the contrary, this patent covers all apparatus and methods fairly falling within the scope of the claims of this patent.

What is claimed is:

1. An apparatus, comprising:
a valve controller operatively coupled to an on/off valve and a control valve, the control valve being operatively positioned downstream from and in series with the on/off valve, the valve controller to:
receive a coordinated control signal, the coordinated control signal being an analog signal having an associated amperage;
determine a discrete control signal and a modulating control signal by comparing the amperage of the coordinated control signal to amperage values included in a correlation list accessible to the valve controller;
control a position of the on/off valve by transmitting the discrete control signal from the valve controller to a first actuator operatively coupled to the on/off valve; and
control a position of the control valve by transmitting the modulating control signal from the valve controller to a second actuator operatively coupled to the control valve.

2. The apparatus of claim 1, wherein the coordinated control signal corresponds to a set point of at least the control valve.

3. The apparatus of claim 1, wherein the coordinated control signal is to be received by the valve controller from a programmable logic circuit or a control system.

4. The apparatus of claim 3, wherein the coordinated control signal is to be received as a single input signal by the valve controller.

5. The apparatus of claim 1, wherein the on/off valve is a first on/off valve, and wherein the valve controller is further operatively coupled to a second on/off valve, the second on/off valve being operatively positioned downstream from the control valve and in series with the first on/off valve and the control valve, the control valve being operatively positioned between the first on/off valve and the second on/off valve, the valve controller to control a position of the second on/off valve based on the coordinated control signal.

6. The apparatus of claim 5, wherein the discrete control signal is a first discrete control signal, and wherein the valve controller is to control the position of the second on/off valve based on a second discrete control signal transmitted by the valve controller to a third actuator operatively coupled to the second on/off valve, the valve controller to transmit the second discrete control signal in response to the coordinated control signal.

7. The apparatus of claim 1, wherein the valve controller is operatively coupled to a pressure transmitter positioned downstream of the on/off valve and upstream of the control valve.

8. The apparatus of claim 7, wherein the valve controller is to receive process data from the pressure transmitter, the process data to indicate whether the control valve is available for servicing.

9. The apparatus of claim 1, wherein the modulating control signal is to cause the control valve to move from a first partially-open position to a second partially-open position.

10. A method, comprising:
receiving a coordinated control signal at a valve controller, the valve controller being operatively coupled to an on/off valve and to a control valve, the control valve being operatively positioned downstream from and in series with the on/off valve, the coordinated control signal being an analog signal having an associated amperage;

determining, via the valve controller, a discrete control signal and a modulating control signal by comparing the amperage of the coordinated control signal to amperage values included in a correlation list accessible to the valve controller;

controlling a position of the on/off valve by transmitting the discrete control signal from the valve controller to a first actuator operatively coupled to the on/off valve; and controlling a position of the control valve by transmitting the modulating control signal from the valve controller to a second actuator operatively coupled to the control valve.

11. The method of claim 10, wherein the on/off valve is a first on/off valve and the discrete control signal is a first discrete control signal, the method further comprising controlling a position of a second on/off valve by transmitting, in response to the coordinated control signal, a second discrete control signal from the valve controller to a third actuator operatively coupled to the second on/off valve, the valve controller being operatively coupled to the second on/off valve, the second on/off valve being operatively positioned downstream from the control valve and in series with the first on/off valve and the control valve, the control valve being operatively positioned between the first on/off valve and the second on/off valve.

12. An apparatus, comprising:
a valve controller operatively coupled to an on/off valve and a control valve, the control valve being operatively positioned downstream from and in series with the on/off valve, the valve controller to:
receive a coordinated control signal, the coordinated control signal being a digital signal having associated bits;
determine a discrete control signal and a modulating control signal by comparing the bits of the coordinated control signal to bit values included in a correlation list accessible to the valve controller;
control a position of the on/off valve by transmitting the discrete control signal from the valve controller to a first actuator operatively coupled to the on/off valve; and
control a position of the control valve by transmitting the modulating control signal from the valve controller to a second actuator operatively coupled to the control valve.

13. The apparatus of claim 12, wherein the coordinated control signal corresponds to a set point of at least the control valve.

14. The apparatus of claim 12, wherein the coordinated control signal is to be received by the valve controller from a programmable logic circuit or a control system.

15. The apparatus of claim 12, wherein the on/off valve is a first on/off valve, and wherein the valve controller is further operatively coupled to a second on/off valve, the second on/off valve being operatively positioned downstream from the control valve and in series with the first on/off valve and the control valve, the control valve being operatively positioned between the first on/off valve and the second on/off valve, the valve controller to control a position of the second on/off valve based on the coordinated control signal.

16. The apparatus of claim 15, wherein the discrete control signal is a first discrete control signal, and wherein the valve controller is to control the position of the second on/off valve based on a second discrete control signal transmitted by the valve controller to a third actuator operatively coupled to the second on/off valve, the valve controller to transmit the second discrete control signal in response to the coordinated control signal.

17. The apparatus of claim 12, wherein the valve controller is operatively coupled to a pressure transmitter positioned downstream of the on/off valve and upstream of the control valve.

18. The apparatus of claim 17, wherein the valve controller is to receive process data from the pressure transmitter, the process data to indicate whether the control valve is available for servicing.

19. A method, comprising:
receiving a coordinated control signal at a valve controller, the valve controller being operatively coupled to an on/off valve and to a control valve, the control valve being operatively positioned downstream from and in series with the on/off valve, the coordinated control signal being a digital signal having associated bits;
determining, via the valve controller, a discrete control signal and a modulating control signal by comparing the bits of the coordinated control signal to bit values included in a correlation list accessible to the valve controller;
controlling a position of the on/off valve by transmitting the discrete control signal from the valve controller to a first actuator operatively coupled to the on/off valve; and
controlling a position of the control valve by transmitting the modulating control signal from the valve controller to a second actuator operatively coupled to the control valve.

20. The method of claim 19, wherein the on/off valve is a first on/off valve and the discrete control signal is a first discrete control signal, the method further comprising controlling a position of a second on/off valve by transmitting, in response to the coordinated control signal, a second discrete control signal from the valve controller to a third actuator operatively coupled to the second on/off valve, the valve controller being operatively coupled to the second on/off valve, the second on/off valve being operatively positioned downstream from the control valve and in series with the first on/off valve and the control valve, the control valve being operatively positioned between the first on/off valve and the second on/off valve.

* * * * *